United States Patent [19]
Saarem et al.

[11] 3,987,430
[45] Oct. 19, 1976

[54] PROGRAMMED CONTROL UNIT

[75] Inventors: Myrl J. Saarem; Delbert L. Merriner, both of Carson City, Nev.

[73] Assignee: Richdel, Inc., Carson City, Nev.

[22] Filed: Sept. 6, 1974

[21] Appl. No.: 503,978

[52] U.S. Cl. .................... 340/309.1; 340/309.6; 200/37 R
[51] Int. Cl.² ............................................ G08B 1/00
[58] Field of Search ............. 340/357, 309.1, 309.6, 340/215; 200/24, 26, 37 R, 38 C, 38 CA, 38 D, 38 DC, 46; 178/84; 307/141.8

[56] References Cited
UNITED STATES PATENTS

| | | | |
|---|---|---|---|
| 3,078,356 | 2/1963 | Friedman et al. | 200/24 |
| 3,111,656 | 11/1963 | Barrett et al. | 340/215 |
| 3,188,407 | 6/1965 | Avgerinos | 200/24 |
| 3,204,236 | 8/1965 | Duris et al. | 340/357 |
| 3,287,633 | 11/1966 | Mollo | 200/24 X |
| 3,432,848 | 3/1969 | La Porta | 340/357 |
| 3,538,270 | 11/1970 | Buechner | 200/46 |
| 3,828,200 | 8/1974 | Gerry | 200/37 R |

*Primary Examiner*—John W. Caldwell
*Assistant Examiner*—William M. Wannisky
*Attorney, Agent, or Firm*—Keith D. Beecher

[57] ABSTRACT

A programmed control unit is provided which is capable of controlling one or more pieces of electrical equipment, and of turning such equipment on and off automatically at pre-established times which may change from day-to-day. The programmed control unit of the invention includes, for example, one or more program storage members which control the electrical switching of one or more associated pieces of equipment on an independent basis, and in accordance with a program which may extend, for example, from day-to-day, for a month or more.

6 Claims, 9 Drawing Figures

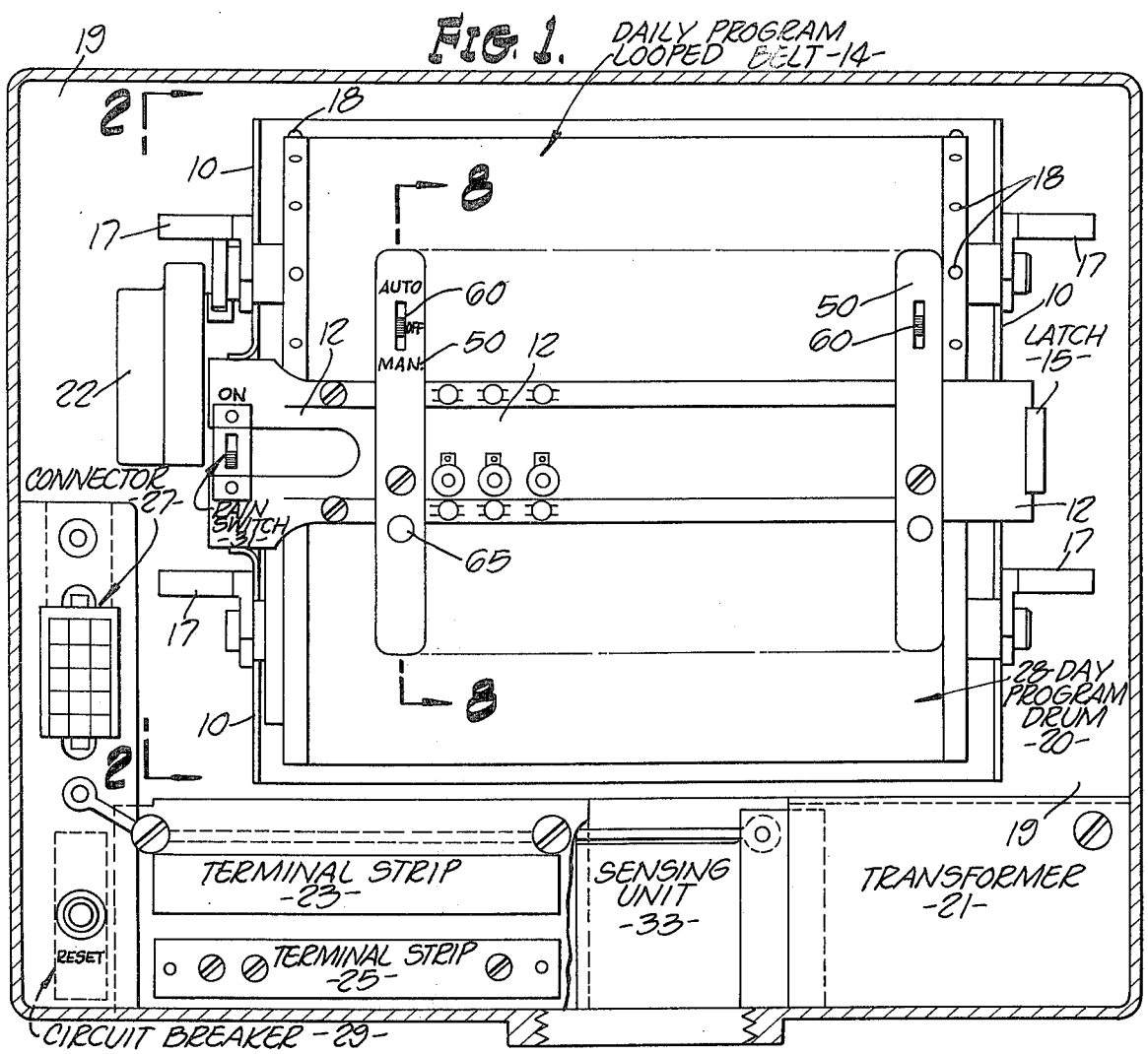
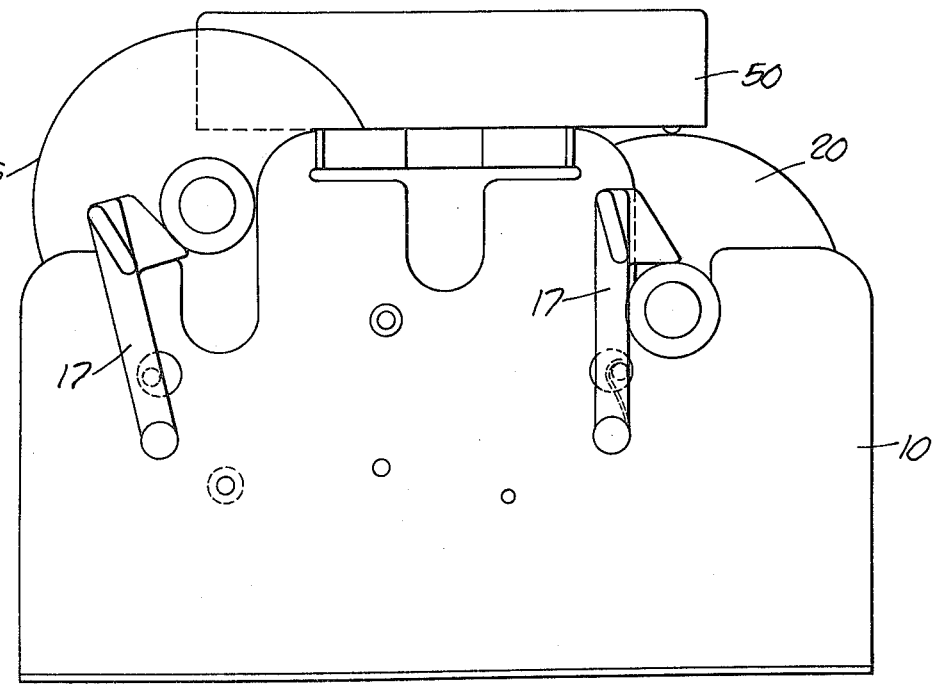

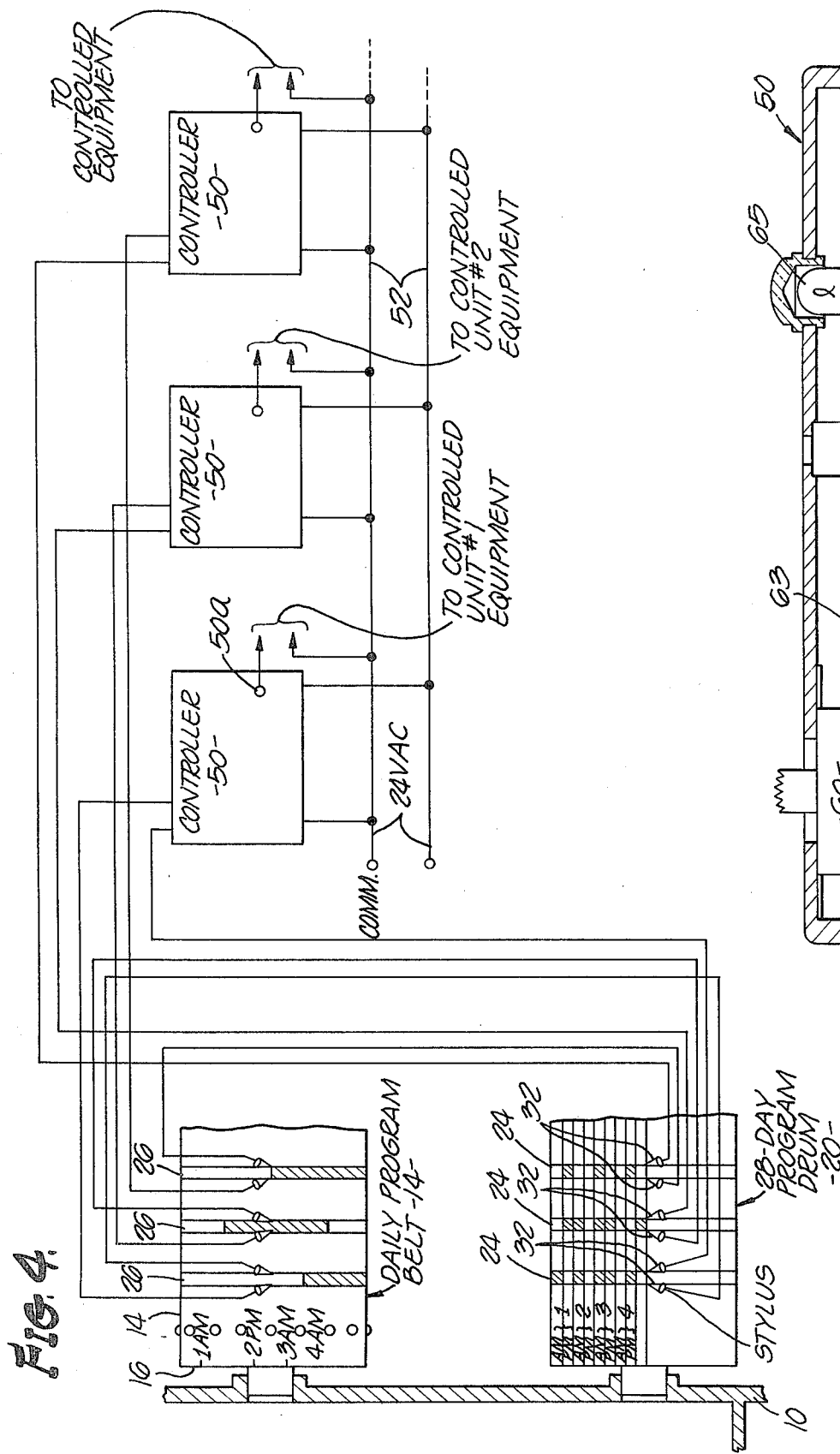
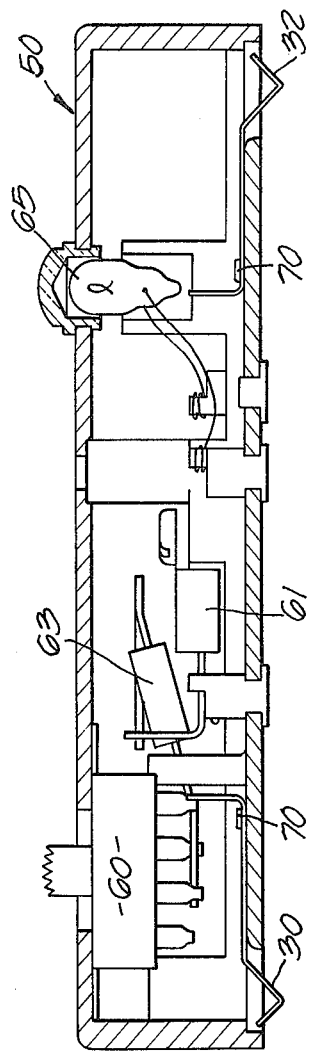
Fig. 4.
Fig. 8.

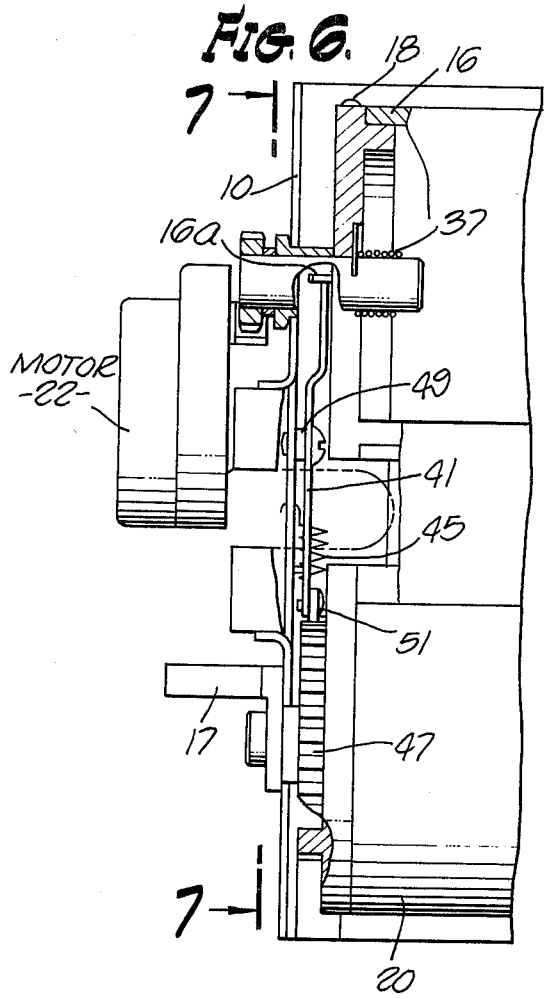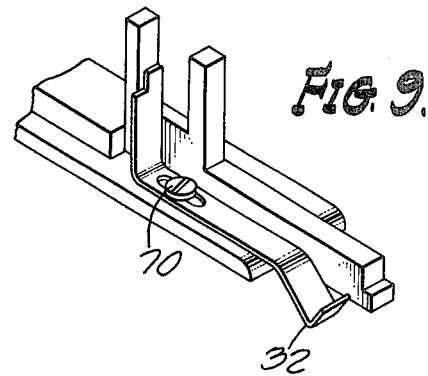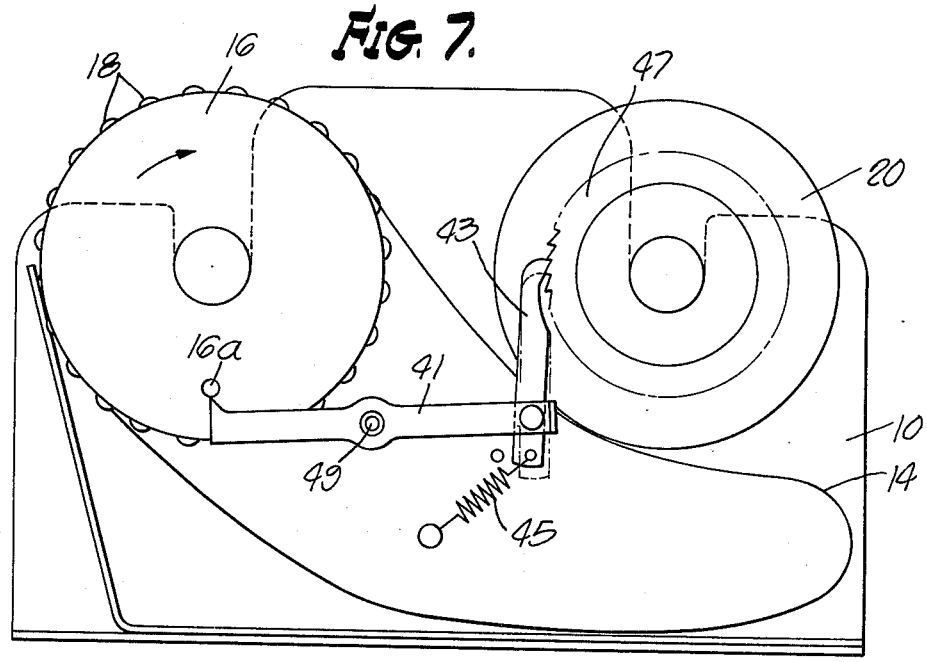

PROGRAMMED CONTROL UNIT

RELATED PATENT APPLICATIONS

Ser. No. 825,768 — filed May 19, 1969 in the name of the present inventors, now abandoned.

BACKGROUND OF THE INVENTION

U.S. Pat. No. 3,101,418, which issued Aug. 20, 1963, and which is assigned to the present assignee, discloses an electric programming unit which is intended to control electrical equipment, such as the solenoid valves of an automatic lawn sprinkling system, on a pre-programmed basis. The unit described in the patent may be set to turn each of a plurality of different valves of the sprinkling system on and off at predetermined times each day. The unit described in the patent also includes a skip-a-day control which is actuated during pre-established 24 hour periods, so that the controlled equipment may remain inactive throughout pre-selected days.

The programmed controller of the present invention is of the same general type as that described in the aforesaid patent, and it may be used for the same purposes. However, the controller of the invention has certain advantages over the unit described in the patent, since it is of a simpler construction. Moreover, the controller of the present invention is more flexible than the controller of the patent, in that it can be set to control a relatively large number of different pieces of electrical equipment, independently of one another, and in that it may be used to turn as required, and over a relatively large number of days, all on a pre-programmed basis.

The present invention, like the controller of the patent, finds particular utility in controlling automatic lawn sprinkler systems, and it serves, for example, to control the times at which different sections of a particular lawn sprinkler system are to be turned on and off during each day, and over, for example, a 28 day interval. However, it will become evident as the description proceeds that the programmed controller of the present invention finds general utility in controlling a variety of electrically energized systems and units, which are to be selectively controlled so as to be turned on and off at predetermined times, and in accordance with pre-established programs. For example, the programmed control unit of the invention may be used to control factory lighting, traffic lights, electrically controlled machine tools, electrically actuated doors, and so on.

A feature of the programmed control unit of the invention, in addition to the flexibility and range of its programmed control functions, is that it is inherently simple to construct, relatively inexpensive to manufacture, and in that it may be easily and conveniently installed and programmed for a wide variety of uses, as set forth above. Another feature of the programmed control unit of the invention is its capability of providing long periods of trouble-free operation, and in that it may be easily serviced, as required.

The particular programmed control unit to be described herein includes two program storage members which, in the specific embodiment to be described, take the form of an endless belt and a drum, respectively. The two storage members are driven at a timed speed by a clock motor which is also included in the unit. However, other equivalent storage members, such as magnetic tapes, magnetic discs, or the like, may be used, as will become evident as the description proceeds.

Each program storage member in the unit to be described, is divided into separate channels, and a different channel on each storage member is used to operate on an independent basis, each of the associated pieces of equipment which are to be controlled by the programmed control unit. The individual channels may contain, for example, electrically conductive and non-conductive segments, and each channel may be sensed by a pair of stylii, with an electrical connection being established across the stylii of each pair whenever a conductive segment of encountered.

In the particular unit to be described, the endless belt storage member is divided into hours and minutes on a 24 hour basis. Each channel on the belt contains conductive and non-conductive segments which establish the times at which each piece of associated equipment is to be turned on and off during each day. The drum storage member has the same number of channels as the belt, and each channel is divided into, for example, two sections, respectively representing morning and afternoon, for each of 28 days. The channels on the drum also contain electrically conductive and non-conductive segments, so that the control by the belt may be superseded by the drum for any day, either in the morning or afternoon, or both.

By virtue of the program storage members discussed, the programmed control unit of the invention is capable of single or multiple channel control of associated pieces of electrical equipment, either for a predetermined program period, or on a repeat cycle mode of operation. The control unit of the invention provides that the different pieces of controlled electrical equipment are switched on and off in accordance with predetermined independent schedules.

The program storage members used in the unit of the invention may take the form of a magnetic tape, belt, drum, disc, or any other suitable form and they may be either single channel or multiple channel. Conductive segments may be formed in the individual channels of the storage members, for example, by a conductive coating, such as conductive paint or graphite, or they may be formed by pieces of conductive tape with a pressure-sensitive adhesive backing. Alternately, the belt may be formed of a conductive material, and programming may then be accomplished by forming insulated areas on the conductive material where the electrical output is not desired. An appropriate adhesive tape, for example, may be used for this purpose.

Other types of program storage members with appropriate transducers may be used. These may include, for example, magnetic tapes, drums or discs, punched tapes, optical recording mediums, and so on. When the aforesaid conductive segment type of storage members are used, the associated sensing stylii are connected to electronic trigger gates, for example, so that low current is maintained through the stylii to minimize arcing, and the triggered gates provide the relatively high switching currents required for controlling the associated equipment.

As mentioned above, the control unit of the invention may be used to control a wide variety of pieces of electrical equipment on a scheduled basis, independently of one another. The control schedule is extremely flexible. The unit may be constructed so that the belt, for example, is easily removable and replaceable, so that control programs may be changed at will. This latter feature is especially desirable in lawn sprinkling systems, for example, for summer and winter sprinkling.

BRIEF DESCRIPTION OF THE DRAWINGS

FIG. 1 is a top plan view of a unit constructed in accordance with one embodiment of the invention;

FIG. 2 is an end view of the unit of FIG. 1, taken essentially along the line 2—2 of FIG. 1;

FIG. 4 is a fragmentary view of certain operating components of the unit of the invention, together with a block diagram of the certain associated electronic controllers;

FIG. 6 is a fragmentary top plan view, partly in section, of the unit, showing the manner in which the operating components are driven;

FIG. 7 is a view taken essentially along the line 7—7 of FIG. 6;

FIG. 8 is a sectional representation of the mechanical configuration of one of the electronic controllers used in the unit, as viewed along the lines 8—8 of FIG. 1; and FIG. 9 is a fragmentary perspective representation of a portion of the controller of FIG. 8.

DETAILED DESCRIPTION OF THE ILLUSTRATED EMBODIMENT

Figure 3:
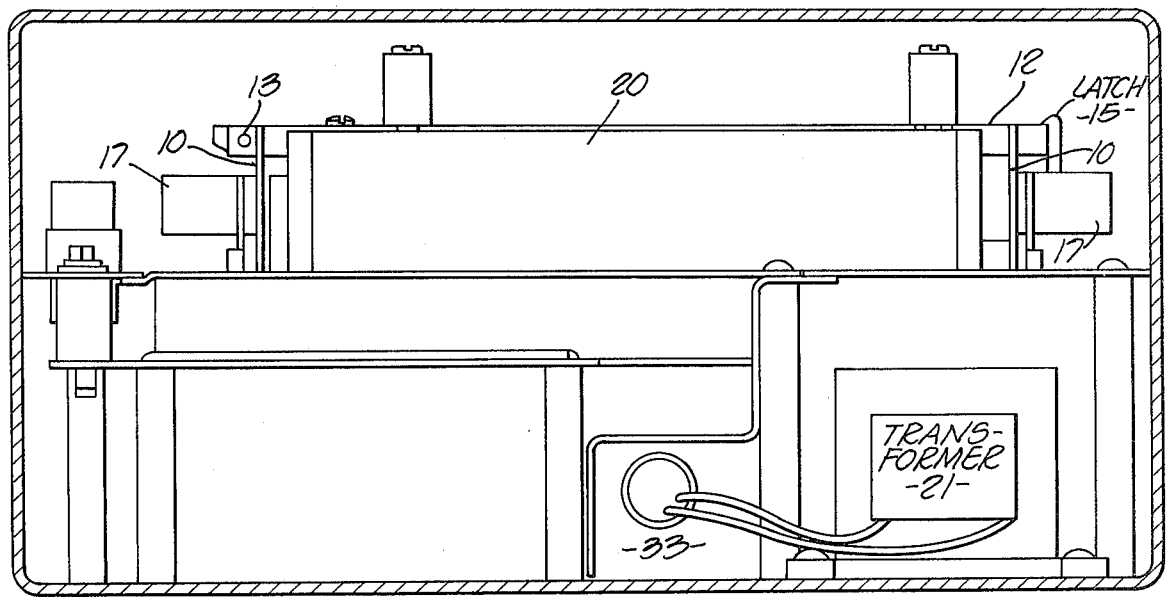
FIG. 3 is a side elevation of the unit of FIG. 1.

As best shown in FIGS. 1-3, for example, the unit of the invention includes an appropriate chassis 10 which supports, for example, a terminal strip 12. The terminal strip is hinged at one end by a hinge 13, and it is latched at the other end by an appropriate latch 15. This enables the terminal strip to be turned up and out of the way, to permit access to the internal operating components of the unit.

A first programmed storage member, in the form of a continuous belt 14, is supported on the chassis 10. The belt extends around a drum 16, and it is contained in a storage space within the chassis 10, as best shown in FIG. 2. The belt 14 may have holes at each side, and these holes may be engaged by protuberances 18 on the drum 16, so as to maintain proper registry between the belt and the drum.

Also included in the unit is drum 20, both the drums 16 and the drum 20 being supported in appropriate bearings on the end walls of the chassis 10. As best shown in FIG. 2, the drum 16 and drum 20 are supported in grooves in the end walls of the chassis 10, and are latched in place by appropriate latches 17. This permits the drums 20 and 16, and the belt 18, to be removed from the chassis 10, after the terminal strip 12 has been unlatched and turned up on its hinge 13, so that program changes on the storage members may be made.

The chassis 10 is supported on an appropriate base 19. A transformer 21 is mounted on the base, and terminal strips 23 and 25 are also mounted on appropriate brackets on the base. In addition, a connector 27 is supported on the base, as is a circuit breaker 29. A rain switch 31 is mounted on the end of the terminal strip 12 to permit the unit to be de-energized, for example, on a rainy day, where sprinkling is not needed.

A sensing unit 33 is also mounted on the base, and it serves to activate a pump in pump operated systems, whenever a valve is energized by the control unit, so that the pump may be turned off between sprinkling operations. The drums 20 and 16 are driven by a motor 22. The motor 22, for example, may be a 24-volt alternate current clock motor. As shown in FIG. 6, for example, the drive shaft 35 of the clock motor 22 is coupled to the drum 16 through a spring clutch 37.

When the drive shaft of the clock motor 22 turns in a first direction, the spring clutch tightens, so that the drum 16 is turned with the motor. However, the drum may be turned in the opposite direction loosely on the motor shaft, so that it can be set to any desired angular setting on the shaft.

As shown in FIG. 7, an indexing pin 16A projects from the end wall of the drum 16 and engages a lever 41 for each revolution of the drum 16. The lever 41 is mounted on a standoff 49 on the end wall of the chassis 10. A pawl 43 is pivotally mounted on the other end of the lever 41 by means of a rivet 51 and the pawl is spring-biased by a spring 45 into ratchet engagement with teeth on a gear 47, mounted on the end wall of the drum 20. The action is such that the monthly program drum 20 is turned one increment for each complete revolution of the daily program drum 16.

Thus, the drum 20 is rotated at one predetermined speed by the clock motor 22, and the drum 16 is rotated at another predetermined speed, to provide desired movement for the belt 14 and for the drum 20. The drum 20, as shown in FIG. 4, is termed a "28-day program drum".

The belt 14, as shown in FIG. 4, is divided into a series of adjacent channels, which extend completely around the belt, and which are designated 26 in FIG. 4. Conductive segments are disposed along the various channels 26 to designate the times at which the associated electrical equipment is to be switched on, during any particular 24-hour period.

The belt 14 itself may be calibrated along one edge, as shown in FIG. 4, in hours and minutes on a 24-hour basis, and the calibrations may be suitably indexed with an indexing symbol on the chassis 10, so that the hours and minutes designated on the belt correspond to the time of day. It will be understood that the drive by the clock motor 22 is such that the belt 14 will make one complete revolution for each 24-hour period, in the particular embodiment under consideration.

The drum 20, on the other hand, is driven at a relatively slow speed, so as to make a complete revolution, for example, once for every 28-day period. The drum 20 is divided into half days, as mentioned above. The drum 20 also has peripheral channels 24 adjacent to one another and corresponding in number to the channels 26 on the belt 14, and corresponding pairs of channels on the belt and drum are used to control the different instrumentalities associated with the unit. As described above, the one-way spring clutch 37 of FIG. 6, permits the drums 16 and 20 to be preset to any desired angular position, so that the unit may be properly calibrated with respect to the time of day.

The channels on the belt 14 are sensed, for example, by a pair of stylii designated 30, and the channels on the drum 20 are sensed, for example, by a pair of stylii designated 32. Whenever a pair of stylii 30 encounters a conductive segment in its channel, a connection is established across the tips, and this also prevails for the corresponding stylii 32. Therefore, when a pair of stylii 30 encounters a conductive segment, the resulting electrical connections are used to trigger a switching circuit, and to switch on an associated piece of equipment. However, the corresponding stylii 32 are connected in series with the stylii 30, so that in the morning or afternoon, or both, of any particular day, the stylii 32 may be made to encounter a non-conductive segment in the corresponding channel, so that no switching is effectuated in the morning or afternoon, or both, on that particular day.

The various stylii 30 and 32 are connected in series, as shown in FIG. 4, and to corresponding electronic controllers designated 50. The controllers 50 are mounted on the top of the unit, as shown in FIG. 1, along the terminal strip 12, and as many controllers as desired for any particular installation may be mounted on the terminal strip. It will be appreciated that when the terminal strip is turned up to permit access to the belt and drums, the controllers are turned up with the terminal strip 12, and their corresponding stylii are disengaged from the channels on the drum 20 and belt 14.

Figure 5:
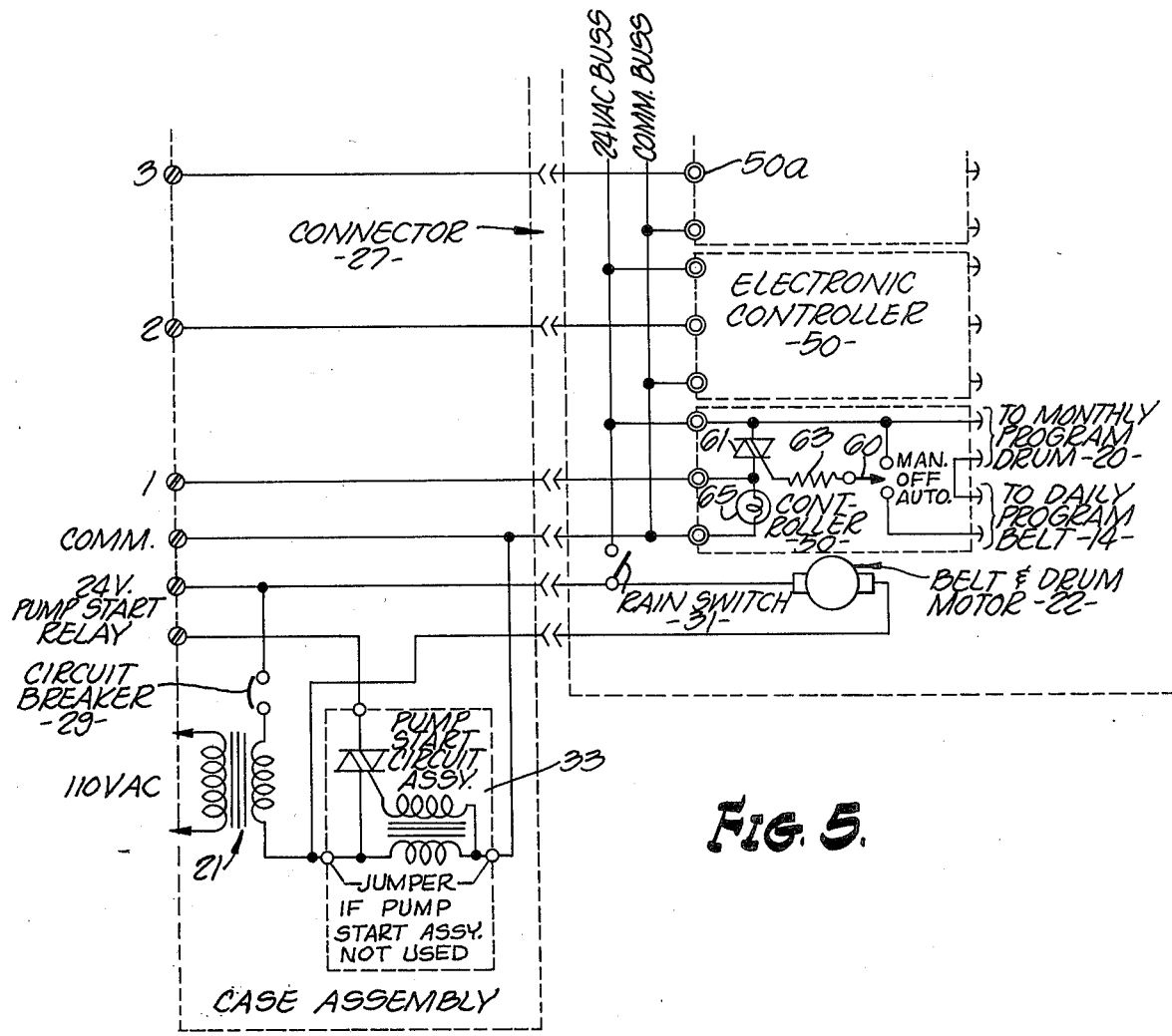
FIG. 5 is a circuit diagram of the electrical elements included in the unit of the invention.

The circuitry of the controllers 50 is connected across the pair of alternating current buses 52, as is the clock motor 22 (FIG. 5). The buses carry, for example 24-volt alternating current, derived from the transformer 21 through the circuit breaker 29. The rain switch 31, as shown in FIG. 5, must be closed, or else the controllers are de-activated, although the drum and belt continues to operate. This means that the program sequence is not lost, even through the equipment is turned off by the rain switch for any particular period of time.

When any one of the electronic controllers 50 is triggered, it provides a connection from its corresponding output terminal and one of the two buses 52, so that a relatively high switching current may flow through the controlled equipment to switch on the particular equipment. It will be appreciated that the control by each of the individual controllers 50 is independent of any of the other controllers, so that the associated pieces of equipment may be independently controlled.

An appropriate trigger gate circuit which may be included in each of the controllers 50 of FIG. 4 is shown in FIG. 5. A manually controlled switch 60, for each controller, may be set either to "off" or to "auto" or to "man". The "off" terminal of the switch is open, whereas the "auto" terminal is connected through the corresponding stylii 30 and 32 to a solid state switching device, such as triac 61. The manual terminal of the switch is connected directly to the triac 61, to fire the triac and actuate the associated equipment, whenever the switch 60 is set to "man". A resistor 63 is interposed between the armature of switch 60 and the triac 61. An indicating lamp 65 is included in each controller 50, which glows to indicate when a particular controller is in its active state.

Therefore, when the switch 60 in any controller 50 is set to "man" the associated piece of equipment is turned on. However, when the switch 60 in any controller 50 is set to "auto", the corresponding equipment is turned on only at predetermined times under the control of the monthly and daily program units.

The connector 27 permits the entire system to be connected to and disconnected from the associated equipment, without any need to disturb the wiring to the equipment itself.

The physical details of the controller 50 are shown in FIGS. 8 and 9. It will be noted that one stylus 30 and one stylus 32 may be adjusted in a longitudinal manner with respect to the other stylus of the pair. This is achieved by loosening and tightening a set screw 70 which extends through a slot in the associated stylus, such as best shown in FIG. 9. This permits the stylii of each pair to be offset with respect to one another slightly to increase the start and stop sensitivity for short time periods without the need to decrease the length of the associated conductive segments below the practical limits.

The invention provides, therefore, a relatively simple and compact programmed control unit, by which a plurality of independent controls may be exerted on various different pieces of extraneous equipment, and by which the different controls may be sustained over relatively long time periods.

It will be appreciated, of course, that the particular embodiment illustrated and described above, is merely by way of example, and equivalent components may be used for suitable modifications. Therefore, although a particular embodiment of the invention has been shown and described, modifications may be made. It is intended in the claims to cover the modifications which come within the spirit and scope of the invention.

What is claimed is:

1. A programmed electrical control unit for controlling the operation of associated electrically energized equipment, said control unit including: a support chassis; program storage member means mounted on the chassis, and including a first storage element in the form of a drum having a plurality of channels thereon with electrically conductive and non-conductive segments in each of said channels representative of morning and afternoon for each of a predetermined number of days, and a second storage element in the form of a belt having a plurality of channels thereon with electrically conductive and non-conductive segments in each of said last-named channels representative of hours and minutes on a 24 hour basis; sensing member means coupled to said program storage member means and generating electric signals upon relative movement therewith, said sensing member means including a first plurality of pairs of electrically conductive stylii positioned for selective contact with said segments in said channels of said first storage element, and a second plurality of pairs of electrically conductive stylii positioned for selective contact with said segments in said channels of said second storage element upon relative movement between said sensing means and said storage member means, an electrical connection being established across the stylii of each of the aforesaid pairs when a conductive segment is encountered thereby, said electrical signals generated by said sensing member means being indicative of predetermined programs stored on said storage member means; clock motor drive means for producing relative movements at different rates between the aforesaid storage elements and their associated stylii at timed speeds so that the belt makes a complete revolution for each 24 hour period and so that the drum makes a complete revolution once for every period representing said predetermined number of days; and a plurality of electronic switching circuits respectively connected to said sensing member means in a series electric circuit connection with corresponding pairs of stylii of said sensing member means in said first and second pluralities, and responsive to the electrical signals generated thereby for producig electrical switching signals for the associated equipment.

2. The combination defined in claim 1, in which said plurality of electronic switching circuits are respectively connected to said stylii in series electrical circuit with corresponding pairs thereof contacting the aforesaid segments on said drum and belt to be triggered from one operative state to another by the aforesaid electrical signals for producing said electrical switching signals.

3. The combination defined in claim 1, in which one stylus of each of said pairs is adjustable longitudinally, and which includes fastening means for holding the stylus in any set longitudinal position.

4. The combination defined in claim 1, and which includes spring clutch means interposed between said drive means and said program storage member means for permitting said drum and belt to be preset to any desired operative position.

5. The combination defined in claim 2, and which includes a plurality of terminal strips mounted on said support chassis in side-by-side relationship and extending across said drum and said belt to support the respective electronic switching circuits, and the stylii respectively connected thereto.

6. The combination defined in claim 1, and which includes latch means coupled to the support chassis for removably mounting the drum and the belt on the support chassis.

* * * * *